US012573416B2

(12) United States Patent
Kaneko et al.

(10) Patent No.: US 12,573,416 B2

(45) Date of Patent: Mar. 10, 2026

(54) CONVERSION MODEL LEARNING APPARATUS, CONVERSION MODEL GENERATION APPARATUS, CONVERSION APPARATUS, CONVERSION METHOD AND PROGRAM

(71) Applicant: NTT, Inc., Tokyo (JP)

(72) Inventors: Takuhiro Kaneko, Musashino (JP); Hirokazu Kameoka, Musashino (JP); Ko Tanaka, Musashino (JP); Nobukatsu Hojo, Musashino (JP)

(73) Assignee: NTT, Inc., Tokyo (JP)

( * ) Notice: Subject to any disclaimer, the term of this patent is extended or adjusted under 35 U.S.C. 154(b) by 183 days.

(21) Appl. No.: 18/289,185

(22) PCT Filed: May 6, 2021

(86) PCT No.: PCT/JP2021/017361

§ 371 (c)(1),
(2) Date: Nov. 1, 2023

(87) PCT Pub. No.: WO2022/234615

PCT Pub. Date: Nov. 10, 2022

(65) Prior Publication Data

US 2024/0221775 A1 Jul. 4, 2024

(51) Int. Cl.
*G10L 25/27* (2013.01)
*G10L 21/013* (2013.01)

(52) U.S. Cl.
CPC ............ *G10L 25/27* (2013.01); *G10L 21/013* (2013.01); *G10L 2021/0135* (2013.01)

(58) Field of Classification Search
CPC ...... G10L 13/047; G10L 25/27; G10L 21/013
(Continued)

(56) References Cited

U.S. PATENT DOCUMENTS 7,366,645 B2 * 4/2008 Ben-Arie ................ G06F 3/011 703/2
2010/0082340 A1 * 4/2010 Nakadai .............. G10L 21/0272 704/240

(Continued)

FOREIGN PATENT DOCUMENTS

JP 2019-035902 A 3/2019
JP 2019-101391 A 6/2019

(Continued)

OTHER PUBLICATIONS

R. Haeb-Umbach et al., "Speech Processing for Digital Home Assistants: Combining Signal Processing With Deep-Learning Techniques," in IEEE Signal Processing Magazine, vol. 36, No. 6, pp. 111-124, Nov. 2019, doi: 10.1109/MSP.2019.2918706. keywords: {Microphones;Speech recognition:Speech processing; Lou (Year: 2019).*

(Continued)

*Primary Examiner* — Bharatkumar S Shah

(57) ABSTRACT

A mask unit generates a missing primary feature quantity sequence in which a part of a primary feature quantity sequence, which is an acoustic feature quantity sequence of a primary voice signal, on a time axis is masked. A conversion unit generates a simulated secondary feature quantity sequence in which a secondary feature quantity sequence which is an acoustic feature quantity sequence of a secondary voice signal having a time-frequency structure corresponding to a primary voice signal by inputting a missing primary feature quantity sequence to a conversion model that is a machine learning model. A calculation unit calculates a learning reference value which becomes higher as a time frequency structure of a simulated secondary feature quantity sequence is closer to a time frequency structure of a secondary feature quantity sequence. An update unit (Continued)

updates parameters of a conversion model on the basis of a learning reference value.

8 Claims, 7 Drawing Sheets

(58) Field of Classification Search
USPC .......................................................... 704/200
See application file for complete search history.

(56) References Cited

U.S. PATENT DOCUMENTS

| | | | | |
|---|---|---|---|---|
| 2015/0332673 | A1* | 11/2015 | Li | G06F 40/30 704/235 |
| 2017/0054547 | A1* | 2/2017 | Nishimoto | H04L 12/40 |
| 2020/0175961 | A1* | 6/2020 | Thomson | G10L 15/063 |
| 2020/0298873 | A1* | 9/2020 | Provost | G10L 15/22 |
| 2020/0395028 | A1* | 12/2020 | Kameoka | G06N 3/0464 |
| 2022/0156552 | A1 | 5/2022 | Kaneko et al. | |

FOREIGN PATENT DOCUMENTS

| | | | |
|---|---|---|---|
| JP | 2019-144402 | A | 8/2019 |
| JP | 2020-140244 | A | 9/2020 |

OTHER PUBLICATIONS

T. Kaneko et al., "CycleGAN-VC2: Improved CycleGAN-Based Non-Parallel Voice Conversion", in Proc. ICASSP, 2019.
T. Kaneko et al., "Maskcyclegan-VC: Learning Non-Parallel Voice Conversion With Filling in Frames", in Proc. ICASSP, 2021.

* cited by examiner

| | SF-TF | | SM-TM | | SF-TM | | SM-TF | |
|---|---|---|---|---|---|---|---|---|
| | MCD [dB] | KDSD [x10$^5$] | MCD [dB] | KDSD [x10$^5$] | MCD [dB] | KDSD [x10$^5$] | MCD [dB] | KDSD [x10$^5$] |
| COMPARATIVE EXAMPLE | 7.66 | 891 | 7.07 | 509 | 6.96 | 494 | 8.07 | 1107 |
| FIRST EMBODIMENT | 7.37 | 467 | 6.77 | 83.8 | 6.73 | 146 | 7.64 | 502 |

Fig. 6

CONVERSION MODEL LEARNING APPARATUS, CONVERSION MODEL GENERATION APPARATUS, CONVERSION APPARATUS, CONVERSION METHOD AND PROGRAM

CROSS-REFERENCE TO RELATED APPLICATIONS

This application is a 371 U.S. National Phase of International Application No. PCT/JP2021/017361, filed on May 6, 2021. The entire disclosure of the above application is incorporated herein by reference.

TECHNICAL FIELD

The present invention relates to a conversion model learning apparatus, a conversion model generation apparatus, a conversion apparatus, a conversion method, and a program.

BACKGROUND ART

Voice quality conversion technique for converting nonverbal information/paralanguage information (such as speaker individuality and utterance style) while keeping language information in inputted voice has been known. As one of the voice quality conversion technique, use of machine learning has been proposed.

CITATION LIST

Patent Literature

Patent Literature 1: Japanese Unexamined Patent Application Publication No. 2019-035902
Patent Literature 2: Japanese Unexamined Patent Application Publication No. 2019-144402
Patent Literature 3: Japanese Unexamined Patent Application Publication No. 2019-101391.
Patent Literature 4: Japanese Unexamined Patent Application Publication No. 2020-140244

SUMMARY OF INVENTION

Technical Problem

In order to convert the nonverbal information and paralanguage information while keeping language information, it is required to faithfully reproduce a time-frequency structure in voice. The time-frequency structure is a pattern of temporal change in intensity for each frequency related to a voice signal. When the language information is kept, it is required to keep the arrangement of vowels and consonants. Even if the nonverbal information and the paralanguage information are different, the vowel and the consonant have respective peculiar resonance frequencies. Therefore, the voice quality conversion keeping the language information can be realized by reproducing the time-frequency structure with high accuracy.

An object of the present invention is to provide a conversion model learning apparatus, a conversion model generation apparatus, a conversion apparatus, a conversion method, and a program capable of accurately reproducing a time-frequency structure.

Solution to Problem

An aspect of the present invention relates to a conversion model learning apparatus, the conversion model learning apparatus includes a mask unit (hereinafter also referred to as "mask") that generates a missing primary feature quantity sequence in which a part of a primary feature quantity sequence, which is an acoustic feature quantity sequence of a primary voice signal, on a time axis is masked, a conversion unit (hereinafter also referred to as "converter") that generates a simulated secondary feature quantity sequence in which a secondary feature quantity sequence, which is an acoustic feature quantity sequence of a secondary voice signal having a time-frequency structure corresponding to the primary voice signal, is simulated by inputting the missing primary feature quantity sequence to a conversion model that is a machine learning model, a calculation unit (hereinafter also referred to as "calculator") that calculates a learning reference value which becomes higher as a time-frequency structure of the simulated secondary feature quantity sequence and a time-frequency structure of the secondary feature quantity sequence become closer to each other, and an update unit (hereinafter also referred to as "updater") that updates parameters of the conversion model on the basis of the learning reference value.

An aspect of the present invention relates to a conversion model generation method, the conversion model generation method including a step of generating a missing primary feature quantity sequence in which a part of a primary feature quantity sequence, which is an acoustic feature quantity sequence of a primary voice signal, on a time axis is masked, a step of generating a simulated secondary feature quantity sequence in which a secondary feature quantity sequence, which is the acoustic feature quantity sequence of a secondary voice signal having a time-frequency structure corresponding to the primary voice signal, is simulated by inputting the missing primary feature quantity sequence to a conversion model that is a machine learning model, a step of calculating a learning reference value which becomes higher as the time-frequency structure of the simulated secondary feature quantity sequence and the time-frequency structure of the secondary feature quantity sequence become closer to each other, and a step of generating a learned conversion model by updating parameters of the conversion model on the basis of the learning reference value.

An aspect of the present invention relates to a conversion apparatus, the conversion apparatus includes an acquisition unit (hereinafter also referred to as "acquirer") that acquires a primary feature quantity sequence which is an acoustic feature quantity sequence of a primary voice signal, a conversion unit (hereinafter also referred to as "converter") that generates a simulated secondary feature quantity sequence in which an acoustic feature quantity sequence of a secondary voice signal having a time-frequency structure corresponding to the primary voice signal is simulated, by inputting the primary feature quantity sequence to the conversion model which is generated by the conversion model generation method, and an output unit (hereinafter also referred to as "outputter") that outputs the simulated secondary feature quantity sequence.

An aspect of the present invention relates to a conversion method, the conversion method includes a step of acquiring a primary feature quantity sequence which is an acoustic feature quantity sequence of a primary voice signal, a step of generating a simulated secondary feature quantity sequence in which an acoustic feature quantity sequence of a secondary voice signal having a time-frequency structure corresponding to the primary voice signal is simulated, by inputting the primary feature quantity sequence to the conversion model which is generated by the conversion model generation method, and a step of outputting the simulated secondary feature quantity sequence.

One aspect of the present invention relates to a program that causes a computer to execute the steps of generating a missing primary feature quantity sequence in which a part of a primary feature quantity sequence, which is an acoustic feature quantity sequence of a primary voice signal, on a time axis is masked, generating a simulated secondary feature quantity sequence in which a secondary feature quantity sequence, which is an acoustic feature quantity sequence of a secondary voice signal having a time-frequency structure corresponding to the primary voice signal, is simulated by inputting the missing primary feature quantity sequence to a conversion model that is a machine learning model, calculating a learning reference value which becomes higher as a time-frequency structure of the simulated secondary feature quantity sequence and a time-frequency structure of the secondary feature quantity sequence become closer, and updating parameters of the conversion model on the basis of the learning reference value.

Advantageous Effects of Invention

According to at least one of the above aspects, the time-frequency structure can be reproduced with high accuracy.

BRIEF DESCRIPTION OF DRAWINGS

FIG. 6 is a diagram showing an experiment result of the voice conversion system according to the first embodiment.

DESCRIPTION OF EMBODIMENTS

The embodiments are described in detail below with reference to the drawings.

First Embodiment

<<Configuration of Voice Conversion System 1>>

Figure 1:
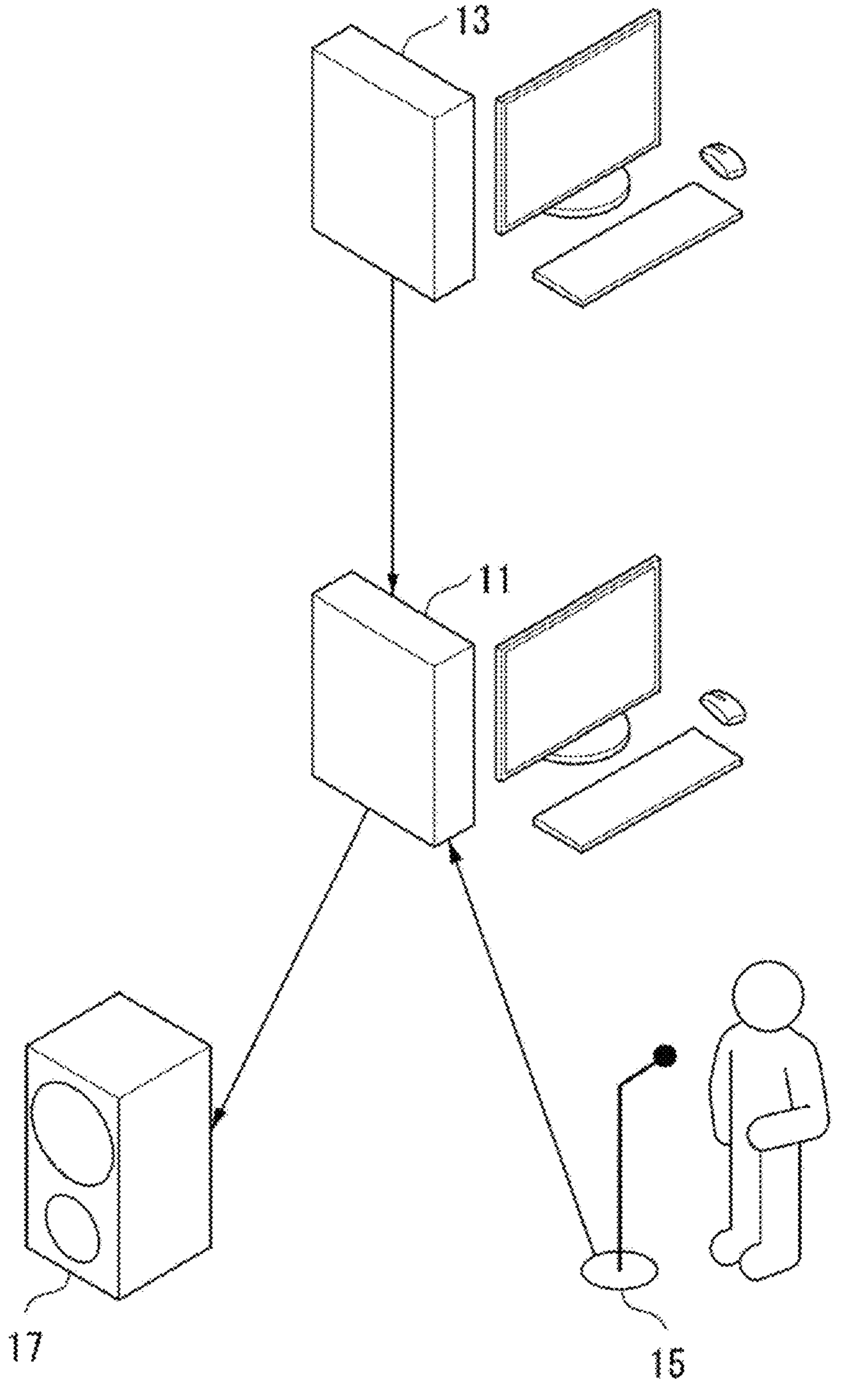
FIG. 1 is a diagram showing a configuration of a voice conversion system according to a first embodiment.

FIG. 1 is a diagram showing a configuration of a voice conversion system 1 according to a first embodiment. The voice conversion system 1 receives input of a voice signal, and generates a voice signal obtained by converting nonverbal information and paralanguage information while keeping language information of the inputted voice signal. The language information means a component in which information which can be expressed as a text in a voice signal appears. The paralanguage information means a component in which psychological information of a speaker appears in a voice signal, such as emotion and attitude of the speaker. The nonverbal information means a component in which physical information of the speaker appears in a voice signal such as gender and age of the speaker. That is, the voice conversion system 1 can convert an inputted voice signal to a voice signal having different nuance while making words equal.

The voice conversion system 1 includes a voice conversion device 11 and a conversion model learning device (apparatus) 13.

The voice conversion device 11 receives input of the voice signal, and outputs the voice signal obtained by converting the nonverbal information and the paralanguage information. For example, the voice conversion device 11 converts the voice signal inputted from the sound collection device 15 and outputs it from a speaker 17. The voice conversion device 11 performs conversion processing of the voice signal by using a conversion model which is a machine learning model learned by the conversion model learning device 13.

The conversion model learning device 13 performs learning of the conversion model by using the voice signal as training data. At this time, the conversion model learning device 13 inputs a voice signal which is training data and in which a part of the voice signal on a time axis is masked to the conversion model, and outputs the voice signal in which the mask part is interpolated, so that the time-frequency structure of the voice signal is also learned in addition to the conversion of the nonverbal information and the paralanguage information.

<<Conversion Model Learning Device 13>>

Figure 2:
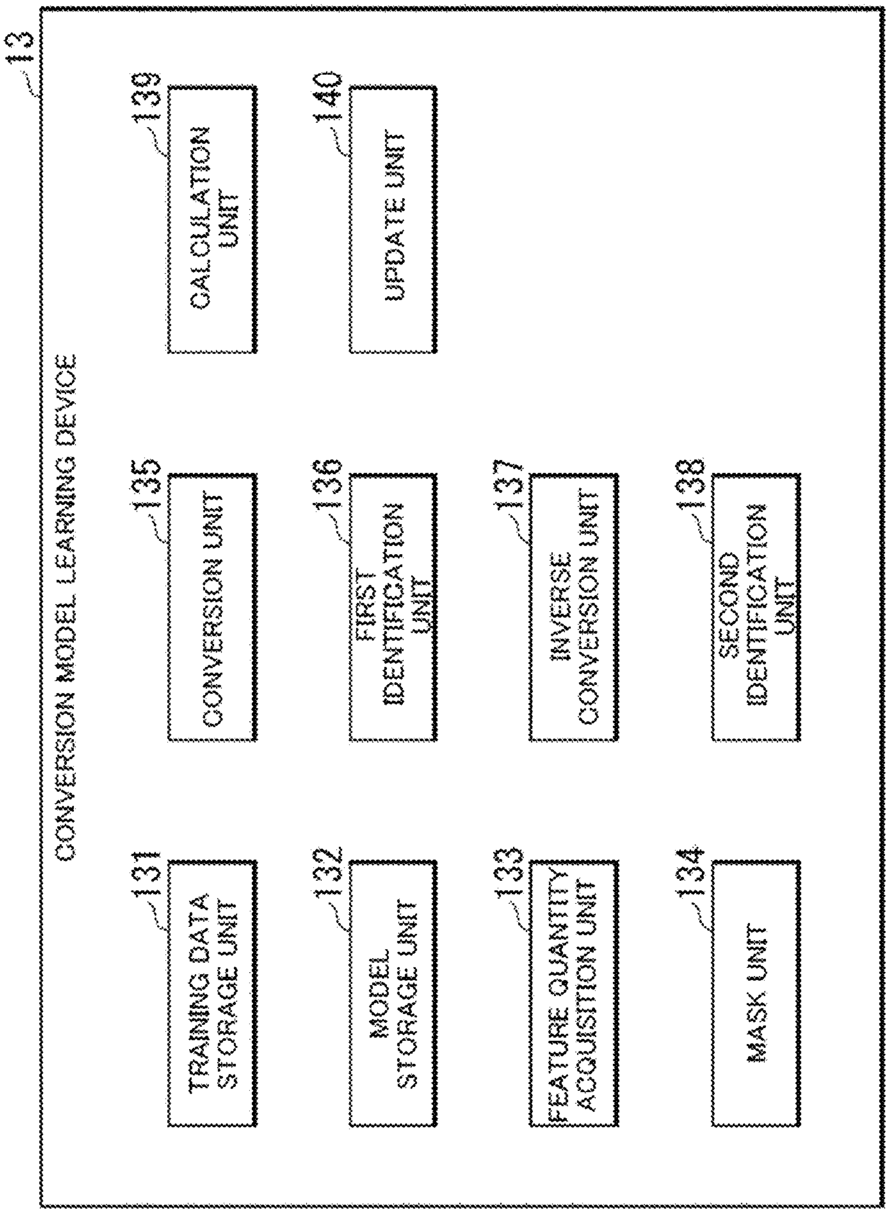
FIG. 2 is a schematic block diagram showing a configuration of a conversion model learning device according to the first embodiment.

FIG. 2 is a schematic block diagram showing a configuration of the conversion model learning device 13 according to the first embodiment. The conversion model learning device 13 according to the first embodiment performs learning of a conversion model by using non-parallel data as training data. The parallel data means data composed of a set of voice signals corresponding to a plurality of (two in the first embodiment) different pieces of nonverbal information or paralanguage information read out from the same sentence. The non-parallel data means data composed of voice signals corresponding to a plurality of (two in the first embodiment) different pieces of nonverbal information or paralanguage information.

The conversion model learning device 13 according to the first embodiment includes a training data storage unit 131, a model storage unit 132, a feature quantity acquisition unit 133, a mask unit 134, a conversion unit 135, a first identification unit 136, an inverse conversion unit (hereinafter also referred to as "inverse converter") 137, a second identification unit 138, a calculation unit 139, and an update unit 140.

The training data storage unit 131 stores an acoustic feature quantity sequence of a plurality of voice signals which are non-parallel data. The acoustic feature quantity sequence is a time-series of feature quantities related to the voice signal. Examples of the acoustic feature quantity sequence include a Mel Cepstral coefficient sequence, a fundamental frequency sequence, an aperiodic index sequence, a spectrogram, Mel Spectrogram, voice signal waveform, and the like are mentioned. The acoustic feature quantity sequence is represented by a matrix of feature quantity number x time. The plurality of acoustic feature quantity sequences stored by the training data storage unit 131 include a data group of voice signals having the nonverbal information and the paralanguage information of a conversion source, and a data group of voice signals having nonverbal information and paralanguage information of a conversion destination. For example, when a voice signal by the male M is to be converted to a voice signal by the female F, the training data storage unit 131 stores an acoustic feature quantity sequence of the voice signal by the male M and an acoustic feature quantity sequence of the voice signal by the female F. Hereinafter, the voice signal having the nonverbal information and the paralanguage information of the conversion source is called a primary voice signal. In addition, the voice signal having the nonverbal information and the paralanguage information of the conversion destination is called a secondary voice signal. Further, the acoustic feature quantity sequence of the primary voice signal is called a primary feature quantity sequence x, and the acoustic feature quantity sequence of the secondary voice signal is called a secondary feature quantity sequence y.

The model storage unit 132 stores a conversion model G, an inverse conversion model F, a primary identification model $D_X$, and a secondary identification model $D_Y$. Each of the conversion model G, the inverse conversion model F, the primary identification model $D_Z$ and the secondary identification model $D_Y$ is composed of a neural network (for example, a convolutional neural network).

The conversion model G inputs a combination of the primary feature quantity sequence and a mask sequence indicating a missing part of the acoustic feature quantity sequence, and outputs the acoustic feature quantity sequence in which the secondary feature quantity sequence is simulated.

The inverse conversion model F inputs a combination of the secondary feature quantity sequence and a mask sequence indicating a missing part of the acoustic feature quantity sequence, and outputs the acoustic feature quantity sequence in which the primary feature quantity sequence is simulated.

The primary identification model $D_X$ inputs the acoustic feature quantity sequence of the voice signal, and outputs a value indicating a probability in which the voice signal related to the inputted acoustic feature quantity sequence is the primary voice signal or a degree in which the voice signal is a true signal. For example, the primary identification model DA outputs a value closer to 0 as a probability in which the voice signal related to the inputted acoustic feature quantity sequence is the voice simulating the primary voice signal is higher, and outputs a value closer to 1 as a probability in which the voice signal is the primary voice signal is higher.

The secondary identification model $D_Y$ inputs the acoustic feature quantity sequence of the voice signal, and outputs a probability in which the voice signal related to the inputted acoustic feature quantity sequence is the secondary voice signal.

The conversion model G, the inverse conversion model F, the primary identification model $D_Z$, and the secondary identification model $D_Y$ constitute CycleGAN. Specifically, a combination of the conversion model G and the secondary identification model $D_Y$, and a combination of the inverse conversion model F and the primary identification model $D_X$ constitute two GAN, respectively. The conversion model G and the inverse conversion model F are Generators. The primary identification model $D_X$ and the secondary identification model $D_Y$ are Discriminators.

The feature quantity acquisition unit 133 reads the acoustic feature amount sequence used for learning from the training data storage unit 131.

The mask unit 134 generates the missing feature quantity sequence in which a part of the feature quantity sequence on the time axis is masked. Specifically, the mask unit 134 generates a mask sequence m which is a matrix having the same size as the feature quantity sequence and in which a mask region is set to "0" and the other region is set to "1". The mask unit 134 determines the mask region on the basis of a random number. For example, the mask unit 134 randomly determines the mask position and mask size in the time direction, and then randomly determines the mask position and mask size in the frequency direction. Note that, in other embodiments, the mask unit 134 may have a fixed value of either the mask position and mask size in the time direction or the mask position and mask size in the frequency direction. Further, the mask unit 134 may always have a mask size in the time direction of the entire time or may always have a mask size in the frequency direction of the entire frequency. Further, the mask unit 134 may randomly determine a portion to be masked in a point unit. In addition, in the first embodiment, the value of the element of the mask sequence is a discrete value of 0 or 1, but the mask sequence may be missing in any form in the original feature sequence or in the relative structure between the original feature sequences. Thus, in other embodiments, the value of the mask sequence may be any discrete value or continuous value, as long as at least one value in the mask sequence is a different value from the other values in the mask sequence. Further, the mask unit 134 may determine these values at random.

When a continuous value is used as the value of the element of the mask sequence, for example, the mask unit 134 randomly determines the mask position in the time direction and the frequency direction, and then determines the mask value at the mask position by the random number. The mask unit 134 sets a value of the mask sequence corresponding to a time-frequency not selected as the mask position, to 1.

The above-mentioned operation for randomly determining the mask position and the operation for determining the mask value by the random number may be performed by designating a feature quantity related to the mask sequence such as the ratio of the mask region in the entire mask sequence and the average value of the mask sequence values. Information representing features of the mask, such as the ratio of the mask region, the average value of the values of the mask sequence, the mask position, the mask size, and the like, is hereinafter referred to as mask information.

The mask unit 134 generates the missing feature quantity sequence by obtaining an element product of the feature quantity sequence and the mask sequence m. Hereinafter, the missing feature quantity sequence obtained by masking the primary feature quantity sequence x is referred to as a missing primary feature quantity sequence x (hat), and the missing feature quantity sequence obtained by masking the secondary feature quantity sequence y is referred to as a missing secondary feature quantity sequence y (hat). That is, the mask unit 134 calculates the missing primary feature quantity sequence x (hat) by the following equation (1), and calculates the missing secondary feature quantity sequence y (hat) by the following equation (2). In the equations (1) and (2), the operator of white circle indicates the element product.

[Math. 1]

$$\hat{x} = x \circ m \quad (1)$$

[Math. 2]

$$\hat{y} = y \circ m \quad (2)$$

The conversion unit 135 inputs the missing primary feature quantity sequence x (hat) and the mask sequence m to the conversion model G stored in the model storage unit 132, and thereby generates the acoustic feature quantity sequence in which the acoustic feature quantity sequence of the secondary voice signal is simulated. Hereinafter, the acoustic feature quantity sequence in which the acoustic feature quantity sequence of the secondary voice signal is simulated is referred to as a simulated secondary feature quantity sequence y'. That is, the conversion unit 135 calculates the simulated secondary feature quantity sequence y' by the following equation (3).

[Math. 3]

$$y' = G(\hat{x}, m) \tag{3}$$

The conversion unit 135 inputs a simulated primary feature quantity sequence x' to be described later and a mask sequence in having all elements of "1" to the conversion model G stored in the model storage unit 132, thereby generating an acoustic feature quantity sequence in which the secondary feature quantity sequence is reproduced. Hereinafter, the acoustic feature quantity sequence obtained in which the acoustic feature quantity sequence of the secondary voice signal is reproduced is referred to as a reproduced secondary feature quantity sequence y". In addition, the mask sequence m in which all elements are "1" is referred to as a 1-filling mask sequence m'. The conversion unit 135 calculates the simulated secondary feature quantity sequence y" by the following equation (4).

[Math. 4]

$$y'' = G(x', m') \tag{4}$$

The first identification unit 136 inputs the secondary feature quantity sequence y or the simulated secondary feature quantity sequence y' generated by the conversion unit 135 to the secondary identification model $D_Y$, and thereby calculates a probability in which the inputted feature quantity sequence is the simulated secondary feature quantity sequence or a value indicating a degree in which the inputted feature quantity sequence is a true signal.

The inverse conversion unit 137 inputs the missing secondary feature quantity sequence y (hat) and the mask sequence m to the inverse conversion model F stored in the model storage unit 132, and thereby generates the simulated feature quantity sequence in which the acoustic feature quantity sequence of the primary voice signal is simulated. Hereinafter, the simulated feature quantity sequence obtained by simulating the acoustic feature quantity sequence of the primary voice signal is referred to as a simulated primary feature quantity sequence x'. That is, the inverse conversion unit 137 calculates the simulated secondary feature quantity sequence x' by the following equation (5).

[Math. 5]

$$x' = F(\hat{y}, m) \tag{5}$$

The inverse conversion unit 137 inputs the simulated secondary feature quantity sequence y' and the 1-filling mask sequence m' to the inverse conversion model F stored in the model storage unit 132, and thereby generates the acoustic feature quantity sequence in which the primary feature quantity sequence is reproduced. Hereinafter, the acoustic feature quantity sequence obtained by reproducing the acoustic feature quantity sequence of the primary voice signal is referred to as a reproduced primary feature quantity sequence x". The conversion unit 135 calculates the simulated primary feature quantity sequence x" by the following equation (6).

[Math. 6]

$$x'' = F(y', m') \tag{6}$$

The second identification unit 138 inputs the primary feature quantity sequence x or the simulated primary feature quantity sequence x' generated by the inverse conversion unit 137 to the primary identification model $D_X$, and thereby calculates a probability in which the inputted feature quantity sequence is the simulated primary feature quantity sequence or a value indicating a degree in which that the inputted feature quantity sequence is a true signal.

The calculation unit 139 calculates a learning reference (loss function) used for learning the conversion model G, the inverse conversion model F, the primary identification model $D_X$, and the secondary identification model $D_Y$. Specifically, the calculation unit 139 calculates the learning reference on the basis of an adversarial learning reference and a cyclic consistency reference.

The adversarial learning reference is an index indicating the accuracy of determination as to whether the acoustic feature quantity sequence is real or simulated feature quantity sequence. The calculation unit 139 calculates the adversarial learning reference $L_{madv}^{Y\text{-}X}$ indicating the accuracy of determination for the simulated primary feature quantity sequence by the primary identification model $D_X$, and the adversarial learning reference $L_{madv}^{Y\text{-}X}$ indicating the accuracy of determination for the simulated secondary feature quantity sequence by the secondary identification model $D_Y$.

The cyclic consistency reference is an index indicating a difference between the acoustic feature quantity sequence related to input and the reproduced feature quantity sequence. The calculation unit 139 calculates the cyclic consistency reference $L_{mcyc}^{X\text{-}Y\text{-}X}$ indicating a difference between the primary feature quantity sequence and the reproduced primary feature quantity sequence, and the cyclic consistency reference $L_{mcyc}^{Y\text{-}X\text{-}Y}$ indicating a difference between the secondary feature quantity sequence and the reproduced secondary feature quantity sequence.

As shown in the following equation (7), the calculation unit 139 calculates a weighted sum of the adversarial learning reference $L_{madv}^{Y\text{-}X}$, the adversarial learning reference $L_{madv}^{X\text{-}Y}$, the cyclic consistency reference $I_{mcyc}^{X\text{-}Y\text{-}X}$, and the cyclic consistency reference $L_{mcyc}^{Y\text{-}X\text{-}Y}$ as a learning reference $L_{full}$. In the equation (7), $\lambda_{mcyc}$ is a weight for the cyclic consistency reference.

[Math. 7]

$$\mathcal{L}_{full}=\mathcal{L}_{madv}^{X\to Y}+\mathcal{L}_{madv}^{Y\to X}+\lambda_{mcyc}\left(\mathcal{L}_{mcyc}^{X\to Y\to X}+\mathcal{L}_{mcyc}^{Y\to X\to Y}\right)\tag{7}$$

The update unit 140 updates parameters of the conversion model G, the inverse conversion model F, the primary identification model $D_X$, and the secondary identification model $D_Y$ on the basis of the learning reference $L_{full}$ calculated by the calculation unit 139. Specifically, the update unit 140 updates the parameters so that the learning reference $L_{full}$ becomes large for the primary identification model $D_X$ and the secondary identification model $D_Y$. In addition, the update unit 140 updates parameters so that the learning reference $L_{full}$ becomes small for the conversion model G and the inverse conversion model F.

<<Index Value>>

Here, an index value calculated by the calculation unit 139 will be described.

The adversarial learning reference is the index indicating the accuracy of determination as to whether the acoustic feature quantity sequence is real or simulated feature quantity sequence. The adversarial learning reference $L_{madv}{}^{Y\text{-}X}$ for the primary feature quantity sequence and the adversarial learning reference $L_{madv}{}^{X\text{-}Y}$ for the secondary feature quantity sequence are represented by the following equations (8) and (9), respectively.

[Math. 8]

$$\mathcal{L}_{madv}^{X\to Y}=\mathbb{E}_{y\sim p_Y(y)}[\log D_Y(y)]+\mathbb{E}_{x\sim p_X(x),m\sim p_M(m)}[\log(1-D_Y(y'))]\tag{8}$$

[Math. 9]

$$\mathcal{L}_{madv}^{Y\to X}=\mathbb{E}_{x\sim p_X(x)}[\log D_X(x)]+\mathbb{E}_{y\sim p_Y(y),m\sim p_M(m)}[\log(1-D_X(x'))]\tag{9}$$

In the equations (8) and (9), of a blackboard bold character indicates an expected value for a distribution indicated by a subscript (the same is also applied to the following equations). $y\sim p_Y$ (y) indicates that the secondary feature quantity sequence y is sampled from a data group Y of the secondary voice signal stored in the training data storage unit 131. Similarly, $x\sim p_X$ (x) indicates that the primary feature quantity sequence x is sampled from a data group X of the primary voice signal stored in the training data storage unit 131. $m\sim p_M$ (m) indicates that one mask sequence m is generated from a group of mask sequences that can be generated by the mask unit 134. Note that although cross entropy is used as a distance reference in the first embodiment, the present disclosure is not limited to the cross entropy in the other embodiments, and other distance references such as L1 norm, the L2 norm, Wasserstein distance may be used.

The adversarial learning reference $L_{madv}{}^{Y\text{-}X}$ takes a large value when the secondary identification model D y can identify the secondary feature quantity sequence y as an actual voice and the simulated secondary feature quantity sequence y (hat) as a synthetic voice. The adversarial learning reference $L_{madv}{}^{Y\text{-}X}$ takes a large value when the primary identification model $D_X$ can identify the primary feature quantity sequence x as the real voice and the simulated primary feature quantity sequence x (hat) as the synthetic voice.

The cyclic consistency reference is an index indicating a difference between the acoustic feature quantity sequence related to input and the reproduced feature quantity sequence. The cyclic consistency reference $L_{mcyc}{}^{X\text{-}Y\text{-}X}$ for the primary feature quantity sequence and the cyclic consistency reference $L_{mcyc}{}^{Y\text{-}Y\text{-}X}$ for the secondary feature quantity sequence are represented by the following equations (10) and (11), respectively.

[Math. 10]

$$\mathcal{L}_{mcyc}^{X\to Y\to X}=\mathbb{E}_{x\sim p_X(x),m\sim p_M(m)}[\|x''-x\|_1]\tag{10}$$

[Math. 11]

$$\mathcal{L}_{mcyc}^{Y\to X\to Y}=\mathbb{E}_{y\sim p_Y(y),m\sim p_M(m)}[\|y''-y\|_1]\tag{11}$$

In the equations (10) and (11), $\|\cdot\|_1$ represents an L1 norm. The cyclic consistency reference $L_{mcyc}{}^{X\text{-}Y\text{-}X}$ a takes a small value when the distance between the primary feature quantity sequence x and the reproduced primary feature quantity sequence x is short. The cyclic consistency reference $L_{mcyc}{}^{X\text{-}Y\text{-}X}$ takes a small value when the distance between the secondary feature quantity sequence y and the reproduced secondary feature quantity sequence y is short.

<<Operation of Conversion Model Learning Device 13>>

Figure 3:
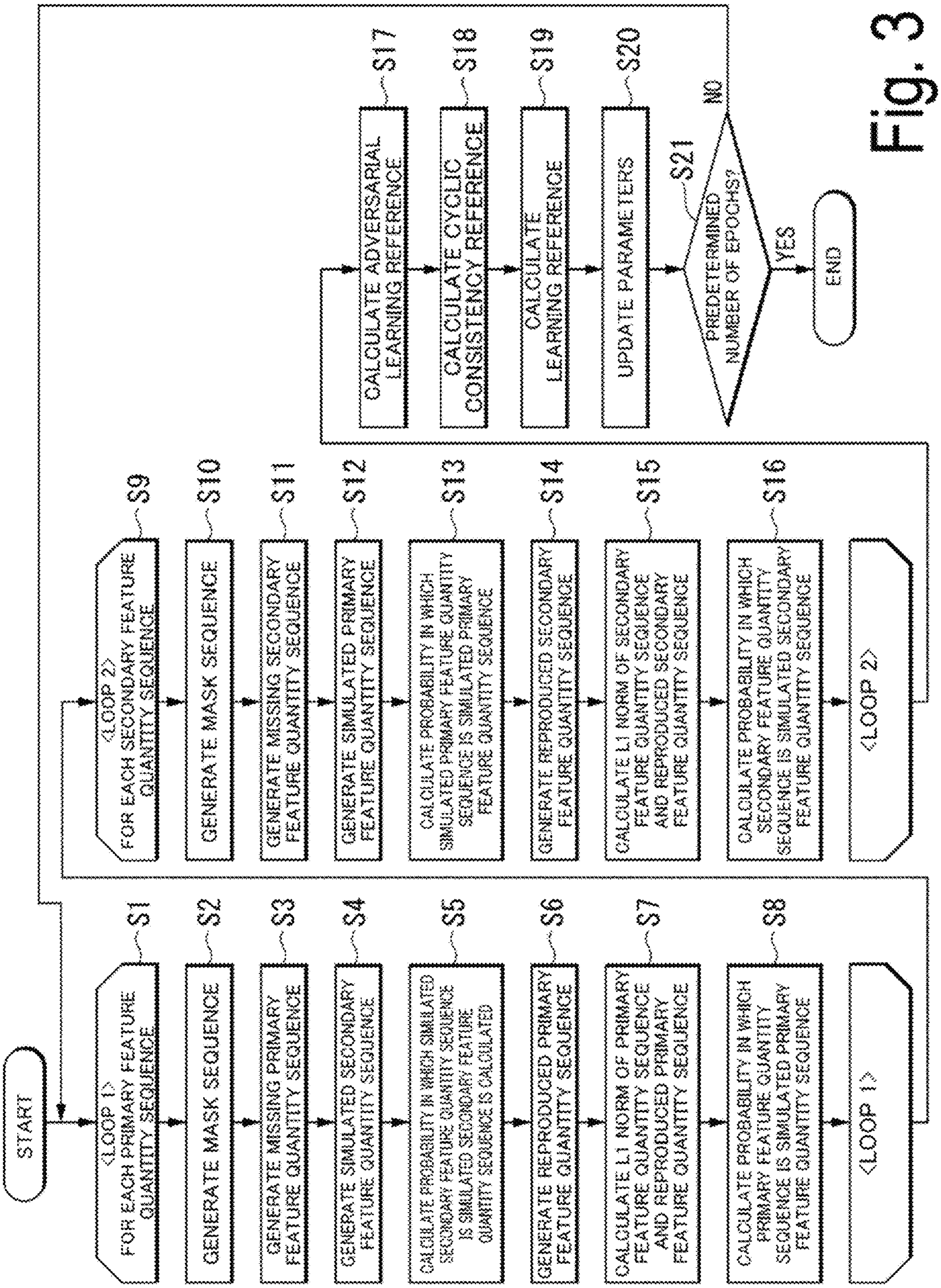
FIG. 3 is a flowchart showing an operation of the conversion model learning device according to the first embodiment.
Figure 4:
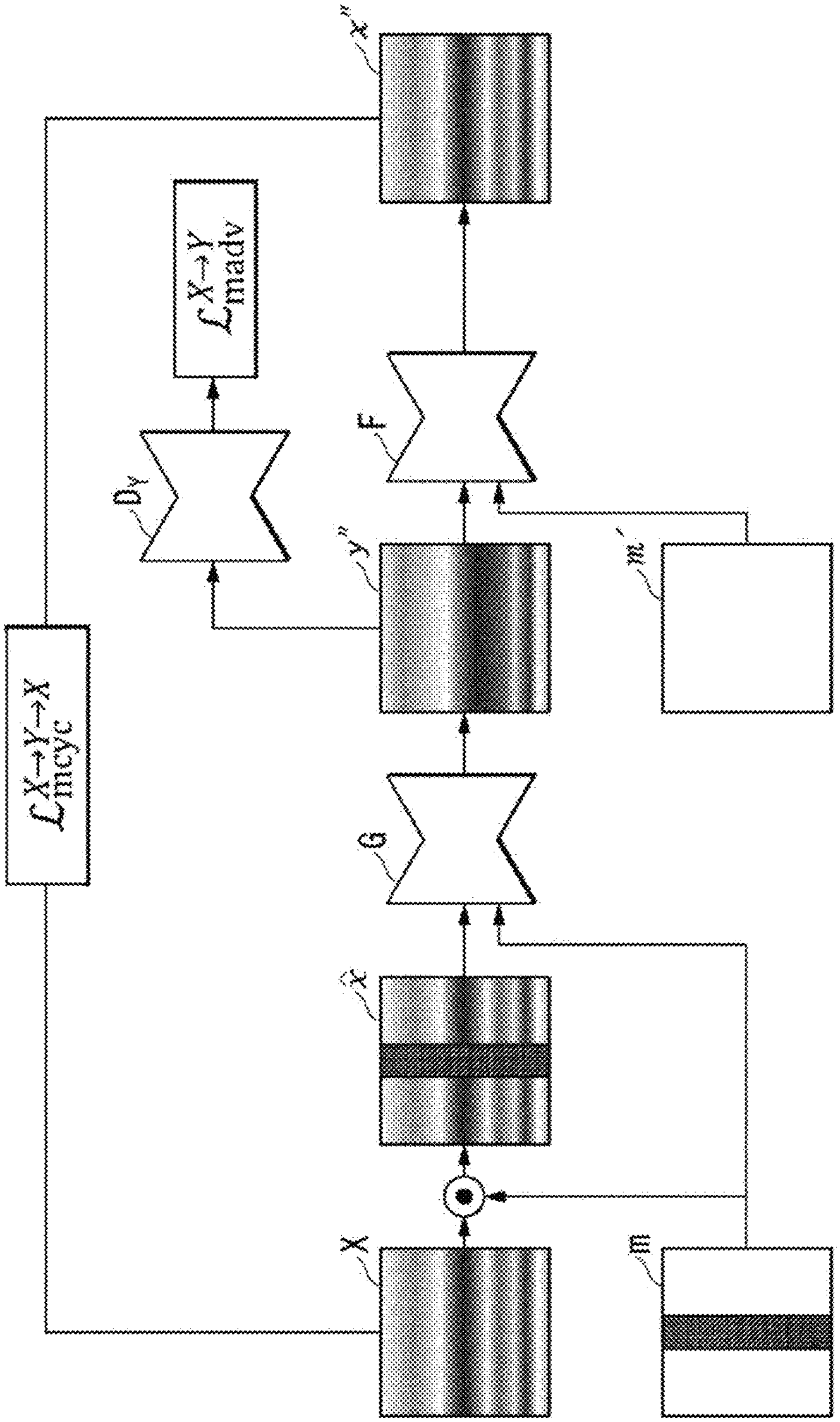
FIG. 4 is a diagram showing a data transition of learning processing according to the first embodiment.

FIG. 3 is a flowchart showing an operation of the conversion model learning device 13 according to the first embodiment. FIG. 4 is a diagram showing a transition of data in the learning processing according to the first embodiment. When the conversion model learning device 13 starts learning processing of the conversion model, the feature quantity acquisition unit 133 reads the primary feature quantity sequence x one by one from the training data storage unit 131 (step S1), and executes processing of the following steps S2 to S7 for each of the read primary feature quantity sequences x.

The mask unit 134 generates the mask sequence m of the same size as the primary feature quantity sequence x read in the step S1 (step S2). Next, the mask unit 134 generates the missing primary feature quantity sequence x (hat) by obtaining an element product of the primary feature quantity sequence x and the mask sequence m (step S3).

The conversion unit 135 inputs the missing primary feature quantity sequence x (hat) generated in the step S3 and the mask sequence m generated in the step S2 to the conversion model G stored in the model storage unit 132 to generate the simulated secondary feature quantity sequence y' (step S4). Next, the first identification unit 136 inputs the simulated secondary feature quantity sequence y' generated in the step S4 to the secondary identification model $D_X$, and calculates a probability in which the simulated secondary feature quantity sequence is the simulated secondary feature quantity sequence y' (step 35).

Next, the inverse conversion unit 137 inputs the simulated secondary feature quantity sequence y' and the 1-filling mask sequence m' generated in the step S4 to the inverse conversion model F stored in the model storage unit 132, and generates the reproduced primary feature quantity sequence x (step S6). The calculation unit 139 obtains an L1 norm of the primary feature quantity sequence x read in the step S1 and the reproduced primary feature quantity sequence x generated in the step S6 (step S7).

In addition, the second identification unit 138 inputs the primary feature quantity sequence x read in the step S1 to the primary identification model. $D_X$ to calculate a probability in which the primary feature quantity sequence x is the simulated primary feature quantity sequence x' (step S8).

Next, the feature quantity acquisition unit 133 reads the secondary feature quantity sequence y one by one from the training data storage unit 131 (step 39), and executes the following processing of steps 10 to S16 for each of the read secondary feature quantity sequences y.

The mask unit 134 generates the mask sequence m of the same size as the secondary feature quantity sequence y read in the step S9 (step 310). Next, the mask unit 134 generates the missing secondary feature quantity sequence y (hat) by obtaining an element product of the secondary feature quantity sequence y and the mask sequence m (step S13.

The inverse conversion unit 137 inputs the missing secondary feature quantity sequence y (hat) generated in the step S11 and the mask sequence m generated in the step S10 to the inverse conversion model F stored in the model storage unit 132 to generate the simulated primary feature quantity sequence x' (step S12). Next, the second identification unit 138 inputs the simulated primary feature quantity sequence x' generated in the step S12 to the primary identification model D x, and calculates a probability in which the simulated primary feature quantity sequence x' is the simulated primary feature quantity sequence x' or a value indicating the degree that the simulated primary feature quantity sequence x' is the true signal (step S13).

Next, the conversion unit 135 inputs the simulated primary feature quantity sequence x' and the 1-filling mask sequence m' generated in the step S12 to the conversion model G stored in the model storage unit 132, and generates the reproduced secondary feature quantity sequence y'' (step S14). The calculation unit 139 obtains an L1 norm of the secondary feature quantity sequence y read in the step 39 and the reproduced secondary feature quantity sequence y''' generated in the step 314 (step S15).

In addition, the first identification unit 136 inputs the secondary feature quantity sequence y read in the step S9 to the secondary identification model D r to calculate a probability in which the secondary feature quantity sequence y is the simulated secondary feature quantity sequence y' or a value indicating a degree in which the secondary feature quantity sequence y is the true signal (step S16).

Next, the calculation unit 139 calculates the adversarial learning reference $L_{madv}^{Y\text{-}X}$ from the probability calculated in the step S5 and the probability calculated in the step S16 on the basis of the equation (8). The calculation unit 139 calculates the adversarial learning reference $L_{madv}^{Y\text{-}X}$ from the probability calculated in the step S8 and the probability calculated in the step S13 on the basis of the equation (9) (step S17). In addition, the calculation unit 139 calculates the cyclic consistency reference $L_{mcyc}^{X\text{-}Y\text{-}X}$ from the L1 norm calculated in the step S7 on the basis of the equation (10). Further, the calculation unit 139 calculates the cyclic consistency reference $L_{mcyc}^{Y\text{-}X\text{-}Y}$ from the L1 norm calculated in the step S15 on the basis of the equation (11) (step S18).

The calculation unit 139 calculates the learning reference $L_{full}$ from the adversarial learning reference $L_{madv}^{X\text{-}Y}$, the adversarial learning reference $L_{madv}^{Y\text{-}X}$, the cyclic consistency reference $L_{mcyc}^{X\text{-}Y\text{-}X}$, and the cyclic consistency reference $L_{mcyc}^{Y\text{-}X\text{-}Y}$ on the basis of the equation (7) (step S19). The update unit 140 updates parameters of the conversion model G, the inverse conversion model F, the primary identification model $D_X$, and the secondary identification model $D_Y$ on the basis of the learning reference $L_{full}$ calculated in the step 319 (step S20).

The update unit 140 judges whether or not the parameter update from the step S1 to the step S20 has been repeatedly executed by the predetermined number of epochs (step S21). When the repetition is less than the predetermined number of epochs (step S21: No), the conversion model learning device 13 returns the processing to the step S1, and repeatedly executes the learning processing.

On the other hand, when the repetition reaches the predetermined number of epochs (step S21: Yes), the conversion model learning device 13 ends learning processing. Thus, the conversion model learning device 13 can generate a conversion model which is a learned model.

<<Configuration of Voice Conversion Device 11>>

Figure 5:
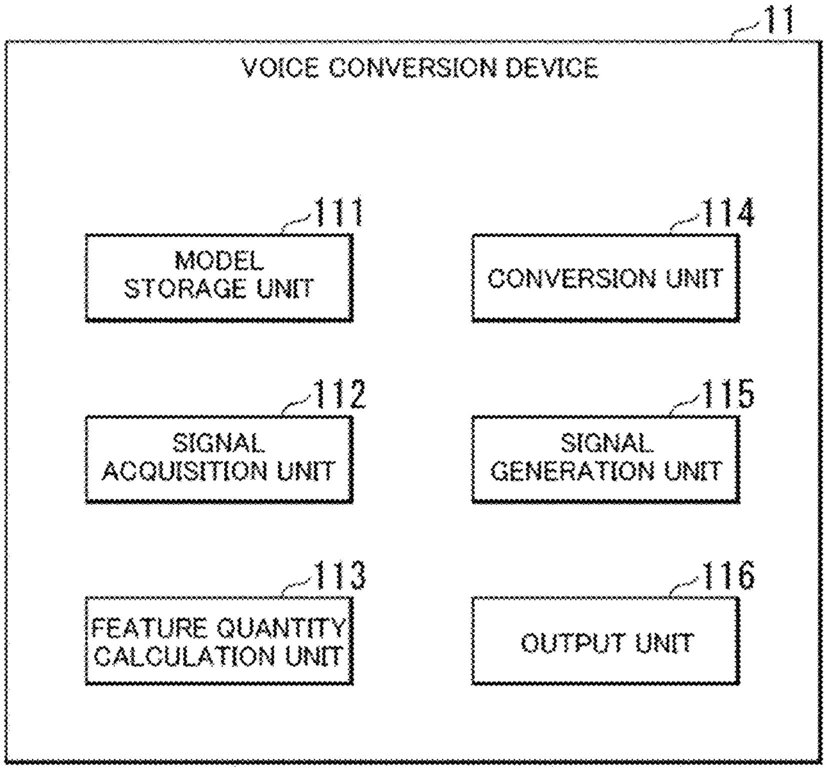
FIG. 5 is a schematic block diagram showing a configuration of a voice conversion device according to the first embodiment.

FIG. 5 is a schematic block diagram showing a configuration of a voice conversion device 11 according to the first embodiment.

The voice conversion device 11 according to the first embodiment includes a model storage unit 111, a signal acquisition unit 112, a feature quantity calculation unit 113, a conversion unit 114, a signal generation unit 115 and an output unit 116.

The model storage unit 111 stores the conversion model G learned by the conversion model learning device 13. That is, the conversion model G inputs a combination of the primary feature quantity sequence x and the mask sequence m indicating a missing part of the acoustic feature quantity sequence, and outputs the simulated secondary feature quantity sequence y'.

The signal acquisition unit 112 acquires the primary voice signal. For example, the signal acquisition unit 112 may acquire data of the primary voice signal recorded in the storage device, or may acquire data of the primary voice signal from the sound collection device 15.

The feature quantity calculation unit 113 calculates the primary feature quantity sequence x from the primary voice signal acquired by the signal acquisition unit 112. Examples of the feature quantity calculation unit 113 include a feature quantity extractor and a voice analyzer.

The conversion unit 314 inputs the primary feature quantity sequence x calculated by the feature quantity calculation unit 113 and the 1-filling mask sequence m' to the conversion model G stored in the model storage unit 111 to generate the simulated secondary feature quantity sequence y'.

The signal generation unit 115 converts the simulated secondary feature quantity sequence y' generated by the conversion unit 114 to voice signal data. Examples of the signal generation unit 115 include a learned neural network model and a vocoder.

The output unit 116 outputs the voice signal data generated by the signal generation unit 115. The output unit 116 may record voice signal data in the storage device, reproduce voice signal data via the speaker 17, or transmit voice signal data via a network, for example.

The voice conversion device 11 can generate the voice signal obtained by converting the nonverbal information and the paralanguage information while keeping language information of the inputted voice signal by the above configuration.

Action and Effect

Thus, the conversion model learning device 13 according to the first embodiment learns the conversion model. G by using the missing primary feature quantity sequence x (hat) obtained by masking a part of the primary feature quantity sequence x. At this time, the voice conversion system 1 uses the cyclic consistency reference $L_{mcyc}^{X\text{-}Y\text{-}X}$ which is a learning reference value that becomes indirectly higher as the time-frequency structure of the simulated secondary feature quantity sequence y' and the time-frequency structure of the secondary feature quantity sequence y become closer. The cyclic consistency reference $L_{mcyc}^{X\text{-}Y\text{-}X}$ is a reference for reducing the difference between the primary feature quantity sequence x and the reproduced primary feature quantity sequence x". That is, the cyclic consistency reference $L_{mcyc}^{X\text{-}Y\text{-}X}$ is a learning reference value which becomes higher as the time-frequency structure of the reproduced primary feature quantity sequence is closer to the time-frequency structure of the primary feature quantity sequence. In order to make the time-frequency structure of the reproduced primary feature quantity sequence close to the time-frequency structure of the primary feature quantity sequence, it is required to appropriately complement the masked portion in the simulated secondary feature quantity sequence for generating the reproduced primary feature quantity sequence and reproduce the time-frequency structure corresponding to the time-frequency structure of the primary feature quantity sequence x. That is, the time-frequency structure of the simulated secondary feature quantity sequence y' requires to reproduce the time-frequency structure of the secondary feature quantity sequence y having the same language information as the primary feature quantity sequence x. Therefore, the cyclic consistency reference $L_{mcyc}^{X\text{-}Y\text{-}X}$ is a learning reference value which becomes higher as the time-frequency structure of the simulated secondary feature quantity sequence y' is closer to the time-frequency structure of the secondary feature quantity sequence y.

In the conversion model learning device 13 according to the first embodiment, parameters are updated so as to interpolate the mask portion in addition to conversion of the nonverbal information and the paralanguage information in a learning process by using the missing primary feature quantity sequence x (hat). In order to perform interpolation, it is required for the conversion model G to predict the mask portion from surrounding information of the mask portion. In order to predict the mask portion from the surrounding information, it is required to recognize the time-frequency structure of the voice. Therefore, according to the conversion model learning device 13 according to the first embodiment, the time-frequency structure of the voice can be obtained in the learning process by learning so that the missing primary feature quantity sequence x (hat) can be interpolated.

Further, the conversion model learning device 13 according to the first embodiment performs learning on the basis of the similarity between the reproduced primary feature quantity sequence x" obtained by inputting the simulated secondary feature quantity sequence y' to the inverse conversion model F and the primary feature quantity sequence x. Thus, the conversion model learning device 13 can learn the conversion model F on the basis of the non-parallel data.

Modification Example

Note that the conversion model G and the inverse conversion model F according to the first embodiment have the acoustic feature quantity sequence and the mask sequence as input, but are not limited to these sequences. For example, the conversion model G and the inverse conversion model F according to another embodiment may input mask information instead of the mask sequence. Further, for example, the conversion model G and the inverse conversion model F according to another embodiment may accept the input of only the acoustic feature quantity sequence without including the mask sequence in the input. In this case, the input size of the network of the conversion model G and the inverse conversion model F is one-half of that of the first embodiment.

Further, the conversion model learning device 13 according to the first embodiment performs learning based on the learning reference $L_{full}$ shown in the equation (7), but is not limited to this. For example, the conversion model learning device 13 according to another embodiment may use an identity conversion reference $L_{mid}^{X\text{-}Y}$ as shown in the equation (12) in addition to or in place of the cyclic consistency reference $L_{mcyc}^{X\text{-}Y\text{-}X}$. The identity conversion reference $L_{mid}^{X\text{-}Y}$ becomes a smaller value as a change between the secondary feature quantity sequence y and the acoustic feature quantity sequence obtained by converting the missing secondary feature quantity sequence y (hat) by using the conversion model G is smaller. Note that, in the calculation of the identity conversion reference $L_{mid}^{X\text{-}Y}$, the input to the conversion model G may be the secondary feature quantity sequence y instead of the missing secondary feature quantity sequence y (hat). It can be said that the identity conversion reference $L_{mid}^{X\text{-}Y}$ is a learning reference value which becomes higher as the time-frequency structure of the simulated secondary feature quantity sequence y' is closer to the time-frequency structure of the secondary feature quantity sequence y.

[Math. 12]

$$\mathcal{L}_{mid}^{X\to Y} = \mathbb{E}_{x\sim p_X(x), m\sim p_M(m)}[\|G(\hat{y}) - y\|_1] \tag{12}$$

In addition, for example, the conversion model learning device 13 according to another embodiment may use the identity conversion reference $L_{mid}^{Y\text{-}X}$ shown in the equation (13) in addition to or in place of the cyclic consistency reference $L_{mcyc}^{Y\text{-}X\text{-}Y}$. The identity conversion reference $L_{mid}^{Y\text{-}X}$ becomes a smaller value as a change between the primary feature quantity sequence x and the acoustic feature quantity sequence obtained by converting the missing primary feature quantity sequence x (hat) by using the conversion model F is smaller. Note that, in the calculation of the identity conversion reference $L_{mid}^{Y\text{-}X}$, the input to the conversion model F may be not the missing primary feature quantity sequence x (hat), but the temporary feature quantity sequence x.

[Math. 13]

$$\mathcal{L}_{mid}^{Y\to X} = \mathbb{E}_{y\sim p_Y(y), m\sim p_M(m)}[\|F(\hat{x}) - x\|_1] \tag{13}$$

In addition, for example, the conversion model learning device 13 according to another embodiment may use the second type adversarial learning reference $L_{madv2}^{X\text{-}Y\text{-}X}$ shown in the equation (14) in addition to or in place of the adversarial learning reference $L_{mcyc}^{X\text{-}Y}$ The second type adversarial learning reference $L_{madv2}^{X\text{-}Y\text{-}X}$ a takes a large value when the identification model identifies the primary feature quantity sequence x as the actual voice and identifies the reproduced primary feature quantity sequence x" as the synthetic voice. Note that the identification model used for the calculation of the second type adversarial learning reference $L_{madv2}^{X\text{-}Y\text{-}X}$ may be the same as the primary identification model $D_X$ or may be learned separately.

[Math. 14]

$$\mathcal{L}_{madv2}^{X\to Y\to X} = \mathbb{E}_{x\sim p_X(x)}[\log D_X(x)] + \mathbb{E}_{x\sim p_X(x), m\sim p_M(m)}[\log(1 - D_X(x'))] \quad (14)$$

In addition, for example, the conversion model learning device 13 according to another embodiment may use the second type adversarial learning reference $L_{madv2}^{Y\text{-}X\text{-}Y}$ shown in the equation (15) in addition to or in place of the adversarial learning reference $L_{mcyc}^{Y\text{-}X}$. The second type adversarial learning reference $L_{madv2}^{Y\text{-}X\text{-}Y}$ takes a large value when the identification model identifies the secondary feature quantity sequence y as the actual voice and identifies the reproduced secondary feature quantity sequence y" as the synthetic voice. Note that the identification model used for the calculation of the second type adversarial learning reference $L_{madv2}^{Y\text{-}X\text{-}Y}$ may be the same as the secondary identification model $D_Y$ or may be learned separately.

[Math. 15]

$$\mathcal{L}_{madv2}^{Y\to X\to Y} = \mathbb{E}_{y\sim p_Y(y)}[\log D_Y(y)] + \mathbb{E}_{y\sim p_Y(y), m\sim p_M(m)}[\log(1 - D_Y(y''))] \quad (15)$$

Further, the conversion model learning device 13 according to the first embodiment causes the GAN to learn the conversion model G, but is not limited thereto. For example, the conversion model learning device 13 according to another embodiment may learn the conversion model G by any deep layer generation model such as VAE.

<<Experimental Result>>

An example of an experimental result of voice signal conversion using the voice conversion system 1 according to the first embodiment will be described. In the experiment, voice signal data related to a female speaker 1 (SF), a male speaker 1 (SM), a female speaker 2 (TF) and a male speaker 2 (TM) were used.

In the experiment, the voice conversion system 1 performs speaker individuality conversion. In the experiment, SF and SM were used as primary voice signals. In the experiment, TF and TM were used as secondary voice signals. In the experiment, each of the sets of primary and secondary voice signals was tested. In other words, in the experiment, the speaker individuality conversion was performed for the set of SF and TF, the set of SM and TM, the set of SF and TM, and the set of SM and TF.

In the experiment, 81 sentences were used as training data for each speaker, and 35 sentences were used as test data. In the experiment, the sampling frequency of the entire voice signal was 22050 Hz. In the training data, there was no same utterance voice between the conversion source voice and the conversion target voice. Therefore, the experiment was an experiment capable of evaluation with non-parallel setting.

In the experiment, a short-time Fourier transform with a window length of 1024 samples and a hop length of 256 samples was performed for each utterance, and then an 80 dimensional mel spectrogram was extracted as an acoustic feature sequence. In the experiment, a waveform generator composed of a neural network is used to generate a voice signal from a mel spectrogram.

The conversion model G, the inverse conversion model F, the primary identification model Dx and the secondary identification model Dy were modeled by CNN, respectively. More specifically, the converters G and F are neural networks having seven processing units from the following first processing unit to the seventh processing unit. The first processing unit is an input processing unit by 2D CNN and is constituted of one convolution block. Note that 2D means two-dimensional. The second processing unit is a down-sampling processing unit by 2D CNN and is constituted of two convolution blocks. The third processing unit is a conversion processing unit from 2D to 1D and is constituted of one convolution block. Note that 1D means one dimension.

The fourth processing unit is a difference conversion processing unit by 1D CNN and is constituted of six difference conversion blocks including two convolution blocks. The fifth processing unit is a conversion processing unit from 1D to 2D and is constituted of one convolution block. The sixth processing unit is an up-sampling processing unit by 2D CNN and is constituted of two convolution blocks. The seventh processing unit is an output processing unit by 2D CNN and is constituted of one convolution block.

In the experiment, CycleGAN-VC2 described in reference document 1 was used as a comparative example. In the learning according to the comparative example, a learning reference combining the adversarial learning reference, the second type adversarial learning reference, the cyclic consistency reference and the identity conversion reference is used.

Reference Document 1: T. Kaneko, H. Kameoka, K. Tanaka, and N. Hojo, "CycleGAN-VC2: Improved CycleGAN-Based Non-Parallel Voice Conversion", in Proc. ICASSP, 2019

The main difference between the voice conversion system 1 according to the first embodiment and the voice conversion system according to the comparative example is that it is determined whether or not the mask processing is performed by the mask unit 134. That is, the voice conversion system 1 according to the first embodiment generates the simulated secondary feature quantity sequence y' from the missing primary feature quantity sequence x (hat) during learning, whereas the voice conversion system according to the comparative example generates the simulated secondary feature quantity sequence y' from the primary feature quantity sequence x during learning.

The evaluation of the experiment was performed based on the two evaluation indices of Mel cepstral distortion (MCD) and Kernel Deep Speech Distance (KDHD). The MCD indicates the similarity between the primary feature quantity sequence x and the simulated secondary feature quantity sequence y' in the Mel cepstral region. For the calculation of MCD, 35-dimensional Mel cepstral was extracted. KDSD indicates the maximum average mismatch (MMD) of the primary feature quantity sequence x and the simulated secondary feature quantity sequence y', and KDSD is an index known to have a high correlation with subjective evaluation in the prior study. Both MCD and KDSD mean that smaller values are better in performance.

FIG. 6 is a diagram showing an experimental result of the voice conversion system 1 according to the first embodiment. In FIG. 6, the reference numeral. "SF-TF" indicates a set of SF and TF. In FIG. 6, the reference numeral "SM-TM" indicates a set of SM and TM. In FIG. 6, the reference numeral "SF-TM" indicates a set of SF and TM. In FIG. 6, the reference numeral "SF-TF" indicates a set of SM and TF.

As shown in FIG. 6, in the experiment, in all of the following "SF-TF", "SM-TM", "SF-TM", and "SF-TF", it was shown that the performance of the voice conversion system 1 according to the first embodiment is better than that of the voice conversion system according to the comparative example in both the MCD and the KDSD evaluation indices. Note that the number of parameters of the conversion model G according to the first embodiment and the conversion model according to the comparative example were both about 16 M, and they were almost unchanged. That is, it has been found that the voice conversion system 1 according to the first embodiment can improve the performance without increasing the number of parameters compared to the comparative example.

Second Embodiment

In the voice conversion system 1 according to the first embodiment, types of nonverbal information and paralanguage information of the conversion source and types of nonverbal information and paralanguage information of the conversion destination are predetermined. On the other hand, the voice conversion system 1 according to a second embodiment performs voice conversion by arbitrarily selecting the type of the voice of a conversion source and the type of the voice of a conversion destination from a plurality of predetermined types of voices.

The voice conversion system 1 according to the second embodiment uses a multi-conversion model $G_{multi}$ instead of the conversion model G and the inverse conversion model F according to the first embodiment. The multi-conversion model $G_{multi}$ inputs a combination of an acoustic feature quantity sequence of the conversion source, a mask sequence indicating a missing part of the acoustic feature quantity sequence, and a label indicating a type of voice of the conversion destination, and outputs a simulated acoustic feature quantity sequence in which a type of voice of the conversion destination is simulated. The label indicating the conversion destination may be, for example, a label attached to each speaker or a label attached to each emotion. It can be said that the multi-conversion model $G_{multi}$ is obtained by realizing the conversion model G and the inverse conversion model F by the same model.

In addition, the voice conversion system 1 according to the second embodiment uses the multi-identification model $D_{multi}$ instead of the primary identification model $D_X$ and the secondary identification model $D_Y$. The multi-identification model $D_{multi}$ inputs a combination of the acoustic feature quantity sequence of the voice signal and the label indicating a type of the voice to be identified, and outputs a probability in which the voice signal related to the inputted acoustic feature quantity sequence is a correct voice signal having nonverbal information and paralanguage information indicated by the label.

The multi-conversion model $G_{multi}$ and the multi-identification model $D_{multi}$ constitute a StarGAN.

A conversion unit 135 of a conversion model learning device 13 according to the second embodiment inputs the missing primary feature quantity sequence x (hat), the mask sequence in, and an arbitrary label $c_Y$ to the multi-conversion model $G_{multi}$ to generate the acoustic feature quantity sequence in which the secondary feature quantity sequence is reproduced. An inverse conversion unit 137 according to the second embodiment inputs the simulated secondary feature quantity sequence y', the 1-filling mask sequence m', and a label $c_X$ related to the primary feature quantity sequence x to the multi-conversion model $G_{multi}$ to calculates the reproduced primary feature quantity sequence x'.

A calculation unit 139 according to the second embodiment calculates an adversarial learning reference by the following equation (16). Further, the calculation unit 139 according to the second embodiment calculates a cyclic consistency reference by the following equation (17).

[Math. 16]

$$\mathcal{L}_{multiadv} = \mathbb{E}_{(x,c_x)\sim p_{X,C}(x,c_x)}[\log D_{multi}(x, c_x)] + \mathbb{E}_{x\sim p_X(x),m\sim p_M(m),c_y\sim p_C(c_y)}[\log(1 - D_{multi}(y', c_y))] \tag{16}$$

[Math. 17]

$$\mathcal{L}_{multicyc} = \mathbb{E}_{(x,c_x)\sim p_{X,C}(x,c_x),c_y\sim p_C(c_y)}[\|x'' - x\|_1] \tag{17}$$

Thus, the conversion model learning device 13 according to the second embodiment can learn the multi-conversion model G so as to perform voice conversion by arbitrarily selecting the conversion source and the conversion destination from a plurality of nonverbal information and paralanguage information.

Modification Example

Note that although the multi-identification model $D_{multi}$ according to the second embodiment inputs the combination of the acoustic feature quantity sequence and the label as input, the present disclosure is not limited to this. For example, the multi-identification model $D_{multi}$ according to another embodiment may be one that does not include a label in an input. In this case, the conversion model learning device 13 may use an estimation model E for estimating the type of voice of the acoustic feature quantity. The estimation model E is a model for outputting a probability in which each of a plurality of labels c is a label corresponding to the primary feature quantity sequence x when the primary feature quantity sequence x is inputted. In this case, a class learning reference $L_{cls}$ is included in the learning reference-$_{full}$ so that the estimation result of the primary feature quantity sequence x by the estimation model E shows a high value in the label $c_x$ corresponding to the primary feature quantity sequence x. The class learning reference $L_{cls}$ is calculated for the real voice like the following equation (18), and is calculated for the synthetic voice by using the following equation (19).

[Math. 18]

$$\mathcal{L}^r_{cls} = \mathbb{E}_{x,c\sim p_X(x,c)}[-\log E(c \mid x)] \tag{18}$$

[Math. 19]

$$\mathcal{L}^f_{cls} = \mathbb{E}_{x\sim p_X(x),c'\sim p_C(c)}[-\log E(c' \mid y')] \tag{19}$$

In addition, the conversion model learning device 13 according to another embodiment may learn the multi-conversion model $G_{multi}$ and the multi-identification model $D_{multi}$ by using the identity conversion reference $L_{mid}$ and the second type adversarial learning reference.

Further, in the modification example, the multi-conversion model $G_{multi}$ uses only the label representing the type of the voice to be converted for the input, but the label representing the type of the voice of the conversion source may also be simultaneously used for the input. Further, similarly, in the modification example, an example in which the multi-identification model D uses only a label indicating the type of the voice to be converted for input has been described, but a label indicating the type of the voice of the conversion source may be simultaneously used for the input.

Further, the conversion model learning device 13 according to the first embodiment causes the GAN to learn the conversion model G, but is not limited thereto. For example, the conversion model learning device 13 according to another embodiment may learn the conversion model G by any deep layer generation model such as VAE.

Note that the voice conversion device 11 according to the second embodiment can convert the voice signal by the same procedure as that in the first embodiment except that a label indicating the type of the voice of the conversion destination is inputted to the multi-conversion model $G_{multi}$.

Third Embodiment

A voice conversion system 1 according to a first embodiment causes a conversion model G to be learned on the basis of non-parallel data. On the other hand, the voice conversion system 1 according to the third embodiment causes the conversion model G to be learned based on the parallel data.

A training data storage unit 131 according to a third embodiment stores a plurality of pairs of primary feature quantity sequences and secondary feature quantity sequences as parallel data.

A calculation unit 139 according to the third embodiment calculates a regression learning reference $L_{reg}$ represented by the following equation (20) instead of the learning reference of the equation (7). An update unit 140 updates parameters of the conversion model G on the basis of the regression learning reference $L_{reg}$.

[Math. 20]

$$\mathcal{L}_{reg} = \mathbb{E}_{x,y \sim p_{X,Y}(x,y), m \sim p_M(m)}[\|y' - y\|_1] \quad (20)$$

Note that the primary feature quantity sequence x and the secondary feature quantity sequence y given as parallel data have time-frequency structures corresponding to each other. Therefore, in the third embodiment, the regression learning reference $L_{reg}$, which becomes higher as the time-frequency structure of the simulated secondary feature quantity sequence y' is closer to the time-frequency structure of the secondary feature quantity sequence y, can be used as the direct learning reference value. By performing learning using the learning reference value, parameters of the model is updated so as to interpolate a mask part in addition to conversion of nonverbal information and paralanguage information.

The conversion model learning device 13 according to the third embodiment does not require to store the inverse conversion model F, the primary identification model $D_X$, and the secondary identification model $D_Y$. In addition, the conversion model learning device 13 may not include the first identification unit 136, the inverse conversion unit 137, and the second identification unit 138.

Note that the voice conversion device 11 according to the third embodiment can convert voice signals according to the same procedure as that in the first embodiment.

Modification Example

The voice conversion system 1 according to another embodiment may perform learning using parallel data for the multi-conversion model $G_{multi}$ as that in the second embodiment.

Other Embodiments

Although the embodiments of the present disclosure have been described in detail above with reference to the drawings, the specific configuration is not limited to such embodiments, and includes any design modifications and the like without departing from the spirit and scope of the present disclosure. That is, in other embodiments, the order of the above-mentioned processing may be changed as appropriate. Also, a part of processing may be performed in parallel.

In the voice conversion system 1 according to the above-described embodiment, the voice conversion device 11 and the conversion model learning device 13 are constituted by separate computers, but the present disclosure is not limited to this. For example, in the voice conversion system 1 according to another embodiment, the voice conversion device 11 and the conversion model learning device 13 may be constituted by the same computer.

<Computer Configuration>

Figure 7:
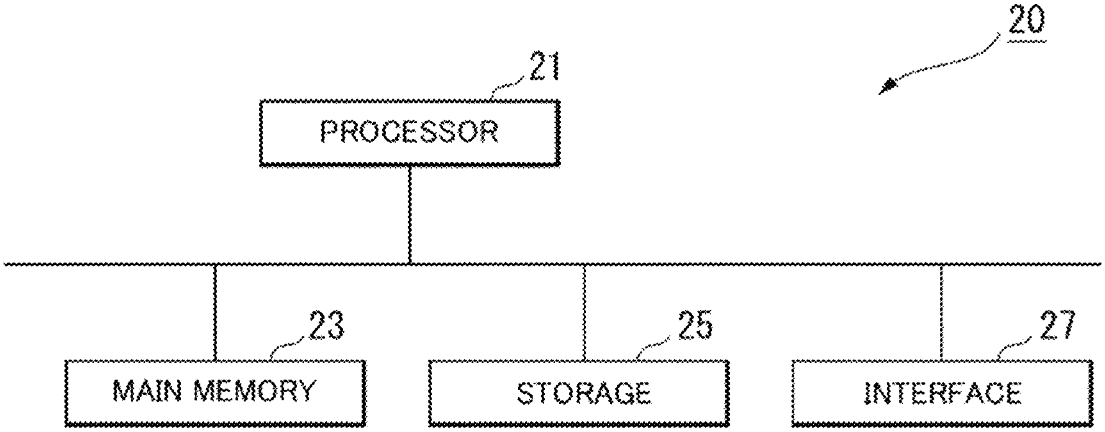
FIG. 7 is a schematic block diagram showing a configuration of a computer according to at least one embodiment.

FIG. 7 is a schematic block diagram showing a configuration of a computer according to at least one embodiment.

The computer 20 includes a processor 21, a main memory 23, a storage 25, and an interface 27.

The voice conversion device 11 and the conversion model learning device 13 are mounted on the computer 20. Then, operations of the above-described processing units are stored in the storage 25 in the form of a program. The processor 21 reads out the program from the storage 25 and develops the program to the main memory 23 to execute the above-described processing in accordance with the program. Further, the processor 21 secures a storage area corresponding to each of the above-mentioned storage units in the main memory 23 in accordance with the program. Examples of the processor 21 include a CPU (Central Processing Unit), a GPU (Graphic Processing Unit), a microprocessor, and the like.

The program may be one for realizing a part of function that causes the computer 20 to exhibit. For example, the program may be combined with other programs already stored in the storage or combined with other programs implemented in other devices to exhibit functions. Note that, in other embodiments, the computer 20 may include a custom LSI (Large Scale Integrated Circuit) such as a PLD (Programmable Logic Device) in addition to the above-described configuration or in place of the above-described configuration. Examples of PLD include a PAL (Programmable Array Logic), a GAL (Generic Array Logic), a CPLD (Complex Programmable Logic Device), and an FPGA (Field Programmable Gate Array). In this case, a part or all of the functions realized by the processor 21 may be realized by the integrated circuit. Such an integrated circuit is also included in an example of the processor.

Examples of the storage 25 include a magnetic disk, a magneto-optical disk, an optical disk, a semiconductor memory, and the like. The storage 25 may be an internal medium directly connected to the bus of the computer 20 or an external medium connected to the computer 20 via an interface 27 or a communication line. In addition, when the program is distributed to the computer 20 through the communication line, the computer 20 receiving the distribution may develop the program in the main memory 23 and execute the above processing. In at least one embodiment, the storage 25 is a non-transitory, tangible storage medium.

In addition, the program described above may be a program for realizing a part of the functions described above. Further, the program may be a program capable of realizing the functions described above in combination with a program already recorded in the storage 25, that is, a difference file (a difference program).

REFERENCE SIGNS LIST

1 Voice conversion system
11 Voice conversion device
111 Model storage unit
112 Signal acquisition unit
113 Feature quantity calculation unit
114 Conversion unit
115 Signal generation unit
116 Output unit
13 Conversion model learning device
131 Training data storage unit
132 Model storage unit
133 Feature quantity acquisition unit
134 Mask unit
135 Conversion unit
136 First identification unit
137 Inverse conversion unit
138 Second identification unit
139 Calculation unit
140 Update unit

The invention claimed is:

1. A conversion model learning apparatus comprising:

a mask configured to generate a missing primary feature quantity sequence in which a part of a primary feature quantity sequence, which is an acoustic feature quantity sequence of a primary voice signal, on a time axis is masked;

a converter configured to generate a simulated secondary feature quantity sequence by inputting the missing primary feature quantity sequence to a conversion model that is a machine learning model, where the simulated secondary feature quantity sequence is simulating a secondary feature quantity sequence and the secondary feature quantity sequence is an acoustic feature quantity sequence of a secondary voice signal having a time-frequency structure corresponding to the primary voice signal;

a calculator configured to calculate a learning reference value which becomes higher as a time-frequency structure of the simulated secondary feature quantity sequence and the time-frequency structure of the secondary feature quantity sequence become closer to each other; and an updater configured to update parameters of the conversion model on the basis of the learning reference value.

2. The conversion model learning apparatus according to claim 1, comprising:

an inverse converter configured to generate a reproduced primary feature quantity sequence which reproduces the acoustic feature quantity sequence of the primary voice signal by inputting the simulated secondary feature quantity sequence to an inverse conversion model that is the machine learning model, wherein the calculator calculates the learning reference value on the basis of similarity between the reproduced primary feature quantity sequence and the primary feature quantity sequence.

3. The conversion model learning apparatus according to claim 2, wherein the inverse conversion model and the conversion model are the same machine learning model, the conversion model is a model in which the acoustic feature quantity sequence and a parameter indicating a type of voice are input and the acoustic feature quantity sequence related to the type indicated by the parameters is output, the converter generates the simulated secondary feature quantity sequence by inputting the missing primary feature quantity sequence and a parameter indicating a type of the secondary voice signal to the conversion model, and the inverse converter generates the reproduced primary feature quantity sequence by inputting the simulated secondary feature quantity sequence and a parameter indicating a type of the primary voice signal to the conversion model.

4. The conversion model learning apparatus according to claim 1, wherein the conversion model is a model in which the acoustic feature quantity sequence and a parameter indicating a type of voice are input and the acoustic feature quantity sequence related to the type indicated by the parameter is output, and the converter generates the simulated secondary feature quantity sequence by inputting the missing primary feature quantity sequence and a parameter indicating a type of the secondary voice signal to the conversion model.

5. The conversion model learning apparatus according to claim 1, wherein the calculator calculates the learning reference value on the basis of a distance between the simulated secondary feature quantity sequence and the secondary feature quantity sequence that is the acoustic feature quantity sequence of the secondary voice signal.

6. The conversion model learning apparatus according to claim 1, wherein the conversion model is a model in which the acoustic feature quantity sequence and mask information of the acoustic feature quantity sequence are input.

7. A conversion model generation method for generating a conversion model having a parameter used for calculation for generating a simulated secondary feature quantity sequence from a primary feature quantity sequence that is an acoustic feature quantity sequence of a primary voice signal, where the simulated secondary feature quantity sequence is simulating a secondary feature quantity sequence and the secondary feature quantity sequence is an acoustic feature quantity sequence of a secondary voice signal having a time-frequency structure corresponding to the primary voice signal, the conversion model generation method comprising:

generating a missing primary feature quantity sequence in which a part of a primary feature quantity sequence, which is an acoustic feature quantity sequence of a primary voice signal, on a time axis is masked;

generating the simulated secondary feature quantity sequence by inputting the missing primary feature quantity sequence to the conversion model that is a machine learning model;

calculating a learning reference value which becomes higher as a time-frequency structure of the simulated secondary feature quantity sequence and the time-frequency structure of the secondary feature quantity sequence become closer to each other; and generating a learned conversion model by updating parameters of the conversion model on the basis of the learning reference value.

8. A conversion apparatus comprising:

an acquirer configured to acquire a primary feature quantity sequence which is an acoustic feature quantity sequence of a primary voice signal;

a converter configured to generate a simulated secondary feature quantity sequence by inputting the primary feature quantity sequence to a conversion model which is generated by a conversion model generation method, where the simulated secondary feature quantity sequence is simulating a secondary feature quantity sequence and the secondary feature quantity sequence is an acoustic feature quantity sequence of a secondary voice signal having a time-frequency structure corresponding to the primary voice signal; and an outputter configured to output the simulated secondary feature quantity sequence, and wherein the conversion model generation method includes:

generating a missing primary feature quantity sequence in which a part of the primary feature quantity sequence on a time axis is masked;

generating the simulated secondary feature quantity sequence by inputting the missing primary feature quantity sequence to the conversion model that is a machine learning model;

calculating a learning reference value which becomes higher as a time-frequency structure of the simulated secondary feature quantity sequence and the time-frequency structure of the secondary feature quantity sequence become closer to each other; and generating a learned conversion model by updating parameters of the conversion model on the basis of the learning reference value.

* * * * *